United States Patent [19]

Yachi et al.

[11] Patent Number: 4,832,746

[45] Date of Patent: May 23, 1989

[54] CURED EXTRUDED ARTICLES OF METAL FIBER-REINFORCED HYDRAULIC MATERIALS, AND METHOD FOR PRODUCTION THEREOF

[75] Inventors: Yoshinori Yachi; Masachika Kubo; Masaki Miwa, all of Tokoname, Japan; Yoshihiko Ojika

[73] Assignee: Inax Corporation, Aichi, Japan

[21] Appl. No.: 106,037

[22] Filed: Oct. 8, 1987

Related U.S. Application Data

[63] Continuation of Ser. No. 689,780, Jan. 8, 1985, abandoned.

[30] Foreign Application Priority Data

Jan. 19, 1984 [JP] Japan ................................... 59-8207

[51] Int. Cl.4 ............................................... C04B 14/48
[52] U.S. Cl. ........................................ 106/99; 106/314
[58] Field of Search ............................ 106/98, 99, 314

[56] References Cited

U.S. PATENT DOCUMENTS 2,456,643 12/1948 Napier ..................................... 106/99
4,132,555 1/1979 Barrable ................................ 106/99
4,306,911 12/1981 Gordon et al. ....................... 106/99

FOREIGN PATENT DOCUMENTS 2439774 8/1974 Fed. Rep. of Germany ........ 106/98
4523 of 1977 Japan .
57-48499 1/1980 Japan ..................................... 106/99
1399335 7/1975 United Kingdom .................. 106/99
1429167 3/1976 United Kingdom .................. 106/99

*Primary Examiner*—William R. Dixon, Jr.
*Assistant Examiner*—Ann M. Knab
*Attorney, Agent, or Firm*—Browdy and Neimark

[57] ABSTRACT

A novel cured extruded article of a metal fiber-reinforced hydraulic material is provided, wherein protrusion of the metal fibers at the extruded surfaces thereof is substantially prevented. The cured extruded article is produced by extruding a blend mixture comprising an inorganic hydraulic material, water, a reinforcing amount of metal fibers having a specified sectional area and a specified length, and a protrusion-preventing amount of non-metal fibers having a specified length into an article, and then curing the resulting article. The extruded article can be glazed by applying a glazing agent onto a desired surface thereof, heating it to a high temperature up to 1000° C., and then hydrating it.

20 Claims, No Drawings

CURED EXTRUDED ARTICLES OF METAL FIBER-REINFORCED HYDRAULIC MATERIALS, AND METHOD FOR PRODUCTION THEREOF

This application is a continuation, of application Ser. No. 689,780, filed 01/08/85 abandoned.

BACKGROUND OF THE INVENTION

1. Field of the Invention:

This invention relates to a cured extruded article of an inorganic hydraulic material reinforced with metal fibers such as iron fibers or stainless steel fibers (hereinafter sometimes referred to as metal fibers), and also a method for production thereof. More particularly, this invention relates to the cured extruded article wherein protrusion of the metal fibers at the extruded surfaces of the article has been substantially prevented by the combined use of the metal fibers and non-metal fibers such as asbestos, carbon fibers, glass fibers, ceramic fibers and plastic fibers (hereinafter sometimes referred to as non-metal fibers), and also a method for production thereof. The cured extruded article normally has satisfactory strength even when the article was coated with a glazing agent and fired.

2. Prior Art:

Hitherto, it has been well known to obtain a molded article of an inorganic hydraulic material by using a mold, which comprises molding, by a method such as casting or pressing, a blend mixture of water, an inorganic hydraulic material such as inorganic cement, calcium silicate or gypsum (hereinafter referred to as inorganic hydraulic materials), and, as necessary, additives such as aggregate (e.g. river sand, gravel, silica sand), water-releasing agents, plasticizers, and expansive agents (hereinafter referred to as additives) into a desired shape. It is known to incorporate either metal fibers or non-metal fibers in such molded articles in order to increase mechanical strength of the resulting molded article (e.g. Japanese Laid-Open Patent Specification No. 4523/1977). It is also known that the above mentioned molded article containing especially about one-inch long metal fibers is increased in its bending strength and the like, and can maintain its initial shape without total fracture when stress is applied to the molded article to form cracks. It is believed, however, to be of no or little value to use both the metal fibers and non-metal fibers because the strength is increased with the metal fibers.

An extrusion method other than the above mentioned molding methods has been employed for molding construction materials, etc. Only non-metal fibers, however, have been actually used as the reinforcing fibers of the extruded articles for the reasons given below.

In the extrusion molding, the fibers are subjected to bending action because a blend mixture is carried by a screw. Immediately after the blend mixture is then extruded from a die and released from the extruding action, the resulting extruded article is subjected to stress acting from its inside to its outside. In this case, the non-metal fibers which were carried and bent are orientated along the flow of the blend mixture when extruded from the die, because non-metal fibers are sufficiently flexible and generally thin in diameter. Thus, in the extrusion molding, the non-metal fibers are completely buried within the extruded article. On the contrary, metal fibers are normally stiff and far thicker in diameter than non-metal fibers because of the process and cost of production. Thus, the metal fibers which were carried and bent can not be orientated straight along the flow of the blend mixture unlike the non-metal fibers. Moreover, the metal fibers can not be satisfactorily buried in the extruded article and are apt to protrude from the extruded surfaces of the article, because of the stress toward the outside of the freshly extruded article. Such extruded articles are not feasible for practical uses and are not so increased in the expected reinforcement effect. In the case of the extruded articles, therefore, only non-metal fibers such as asbestos have been used for such reinforcement.

Incidentally, there might be literature reporting that a blend mixture of an inorganic hydraulic material composition containing metal fibers alone was extruded. Such extruded articles if any are not feasible for practical uses and a lot of the metal fibers must have protruded at the extruded surfaces thereof. Such extruded articles are not on the market as far as known by the present inventors.

Incidentally, it may be possible to cast cement mortar containing both non-metal fibers and especially thin metal fibers in a mold. It is impossible, however, to extrude such cement mortar as explained in detail below.

SUMMARY OF THE INVENTION

The present inventors have conducted intensive research on production of excellent extruded articles by reinforcing inorganic hydraulic materials with metal fibers. It has been unexpectedly found that protrusion of the metal fibers can be substantially prevented and satisfactory reinforcement effects can be obtained by combined use as reinforcing fibers of non-metal fibers and metal fibers having a sectional area corresponding to a circle of 80 microns or more in diameter and a length of 20 mm or less. It has also been found that satisfactory strength can be obtained when the extruded article is coated with a glazing layer and fired, preferably by the use as the metal fibers of anticorrosive fibers such as stainless steel fibers.

Thus, an object of the present invention is to provide a cured extruded article of an inorganic hydraulic material reinforced with metal fibers and a method for production thereof, wherein protrusion of the metal fibers are substantially prevented.

Another object of the present invention is to provide a cured extruded article of the reinforced inorganic hydraulic material and a method for production thereof, wherein practical strength can be satisfactorily maintained when the extruded article is coated with a glazing layer and fired.

The present extruded article of the reinforced inorganic hydraulic material wherein protrusion of metal fibers at extruded surfaces is substantially prevented consists essentially of an extruded article of a blend mixture comprising an inorganic hydraulic material, water, a reinforcing amount of metal fibers having a sectional area corresponding to a circle of about 0.08 to about 1 mm in diameter and a length of about 3 to about 20 mm, a protrusion-preventing amount of non-metal fibers having a length of from about 1/5 of the metal fibers to about 30 mm, and as necessary additives such as aggregate, water-releasing agents, plasticizers, expansive agents and mixtures thereof.

The cured extruded article according to the present invention is obtained by curing the above mentioned extruded article with hydration in air or, as necessary, in water, in steam or in an autoclave, etc. A glazed layer can be applied on a desired surface of the extruded article by applying an ordinary glazing agent onto the desired surface, heating the glazed surface or the entire article to a temperature of from a melting temperature of the glazing agent to about 1000° C., and then hydrating the article.

The above mentioned extruded article is obtained by extruding via a die an extruding material containing the above described components. In order to ensure the effect of the present invention on substantially preventing protrusion of metal fibers at extruded surfaces, it is desirable to blend an inorganic hydraulic material composition, metal fibers and non-metal fibers in a dry state to substantially disperse the fibers uniformly, and then to mix them with water. Incidentally, such dry blending is not especially required when a cement composition is mixed with non-metal fibers for extrusion or with metal fibers for cast molding. It is considered that such dry blending is desirable in the present invention because it is preferable that the metal fibers are partially surrounded with the non-metal fibers to substantially prevent the protrusion and also the dispersibility of the both fibers is different.

DETAILED DESCRIPTION OF THE INVENTION

The term "reinforcing amount" of metal fibers used herein means a quantity of the metal fibers which is effective for the reinforcement of the present invention and can be bound by the hydraulic material composition. The term "protrusion-preventing amount" of non-metal fibers means a quantity of non-metal fibers which is effective for substantially preventing protrusion of metal fibers and can be bound by the hydraulic material composition.

The term "to substantially prevent protrusion of metal fibers" herein means decreasing the numbers of metal fibers protruding at the surfaces of the extruded article to about ½ or less, preferably to about ⅓ or less, more preferably to about ¼ or less, and typically to a range of about 1/5 to zero, in comparison with those of a possible extruded article reinforced with metal fibers alone.

The inorganic hydraulic materials to be used in the present invention include, for examples, conventional hydraulic materials such as portland cement, alumina cement, other cement, gypsum slag, calcium silicate, gypsum, and mixtures thereof. Cement materials and especially portland cement are pretically used.

The metal fibers to be used are represented by iron fibers, steel fibers, stainless steel fibers, and mixtures thereof. The iron fibers or steel fibers may be plated with an anticorrosive metal. When the extruded article is to be fired, for example, to apply a glazed layer thereto, substantially anticorrosive metal fibers such as stainless steel fibers are preferably used in order to prevent the fibers from deterioration such as oxidation due to the firing.

The metal fibers can have sectional shapes of a circle, a quadrangle or a semicircle or other sectional shapes such as a crescent. The metal fibers can be straight, curved or waved in the direction of length. When the sectional shape is flat, the ratio of one side to the other side is normally in the range of 1 to about 20 or less.

The sizes of the metal fibers to be used fundamentally depend on the performances of extruders as well as the dimensions, sectional shapes and the like of the extruded articles. Such metal fibers, however, have the sectional area of a circle of about 80 microns or more, preferably in the range of about 0.1 to about 1 mm in diameter, or the same sectional area of other sectional shapes i.e. about 0.005 sq. mm or more, preferably in the range of about 0.007 to about 0.8 sq. mm (hereinafter such thickness or sectional area being sometimes referred to as the corresponding diameter), as well as have the length in the range of generally about 3 to about 20 mm, normally about 4 to about 18 mm, and preferably about 5 to about 15 mm. When the corresponding diameter of metal fibers is less than about 70 microns, a satisfactory extruded article can not be obtained because the metal fibers are heavily entangled together and uniform mixing of fibers is apt to become difficult. When the length of metal fibers is over about 20 mm, orientation of metal fibers, recovery of bent metal fibers, and prevention of metal fibers from protruding at the extruded surfaces become difficult.

For the same reasons (e.g. uniform mixing of the fibers and prevention of metal fibers protruding at extruded surfaces) and costs, the quantity to be added of the metal fibers is generally about 1 to about 20 parts, preferably about 2 to about 15 parts by weight per 100 parts by weight of the inorganic hydraulic material. From the viewpoint of reinforcement, the quantity of the metal fibers to be added is about 3 to about 20 parts, preferably about 4 to about 15 parts by weight.

The non-metal fibers to be used are, for example, one or more types of non-metal fibers available on the market, which are represented by asbestos, rock wools, carbon fibers, glass fibers, ceramic fibers, synthetic fibers, plastic fibers and mixtures thereof. Asbestos fibers are generally preferred from the viewpoint of bonding properties and costs. The thickness of non-metal fibers is not especially restricted, which can be the thickness of the fibers available on the market. The length of non-metal fibers is desirable to be not more than about 30 mm. Also, the length is generally required to be about 1/5 or more, preferably about ⅓ or more of the length of metal fibers to be used. When the length is over about 30 mm, such non-metal fibers are heavily entangled together and thus uniform mixing of fibers becomes difficult.

The quantity of non-metal fibers to be added is about ⅛ or more, preferably in the range of about 1/6 to about ⅓ or more by weight of the metal fibers used. When the quantity of non-metal fibers is less than about ⅛, protrusion of metal fibers at extruded surfaces can not be prevented satisfactorily. Incidentally, use of non-metal fibers in an amount of 2 times or more by weight of metal fibers is generally worthless, which sometimes results in an adverse effect on strength when the resulting article is fired for glazing. The ratio of the non-metal fibers to be used to an inorganic hydraulic material is generally from about 1 to about 15, preferably from about 2 to about 10 parts by weight of 100 parts of the inorganic hydraulic material. When the extruded article is fired for glazing, the above mentioned ratio is generally from about 1 to about 6 parts, preferably from about 2 to about 5 parts by weight. Incidentally, such ratio is not especially restricted when heat-resistant fibers such as ceramic fibers are used.

The quantities to be added of water and aggregate such as ceramic fragments, glass fragments, river sand, gravel, silica sand or mxtures thereof as well as additives such as water-releasing agents, plasticizers, expansive agents or mixtures thereof depend on the total formulation, extruding properties and the like of a blend mixture to be extruded. In general, suitably used are about 20 to about 40 parts of water, about 200 parts or less of aggregate and about 1 to about 3 parts of plasticizer per 100 parts by weight of an inorganic hydraulic material. As to other additives, conventional amounts are generally employed.

An extruded article having a glazed layer on a desired surface thereof is obtained, for example, by curing an extruded article produced according to the above described conditions to some extent, applying a glazing agent onto the surface thereof by a conventional method such as spraying or curtaining, heating the extruded article thus treated for about 15 minutes to about 3 hours at a temperature of generally 600° to 1000° C., preferably about 650° to about 950° C. to provide the glazed layer, and then subjecting the glazed article to re-hydration by a conventional method such as soaking in water, curing in steam or wet atmosphere and/or curing in an autoclave.

Incidentally, the metal fibers and non-metal fibers contained in an extruded article according to the present invention are substantially orientated in the direction of extrusion, whereby the strength of the resulting extruded article is especially enhanced in the extruded direction. Such orientation of fibers can not be found in other molded articles and also can not be produced by a molding method other than the present extrusion method.

The present invention is further explained by way of the following Examples and Comparative Examples. The quantities are by weight unless otherwise specified.

Example 1

A mixture of 100 parts of ordinary portland cement used as the inorganic hydraulic material, 110 parts of fragments of porcelain tile used as aggregate, 1.9 parts of methylcellulose used as a plasticizer (Hi-metolose 90SH-15000 supplied by Shinetsu Kagaku Kogyo K.K., Japan), 10 parts of stainless steel fibers 0.3 (thickness) ×0.5 (width) ×10 (length) mm used as the metal fibers (IS Fiber supplied by Igeta Kohan K.K., Japan) and 2.5 parts of asbestos fibers (mean length 5.5 mm, mean diameter 1.5 microns) used as the non-metal fibers (6D-5EX supplied by LAQ Company) was blended for several minutes in an omnimixer (OM-30 supplied by Chiyoda Giken Kogyo K.K., Japan). The blend was further mixed with 32 parts of water. The resulting blend mixture was extruded from an extruder (DE-100 supplied by Honda Tekko K.K., Japan) to obtain an extruded body having a sectional area of 10×100 mm.

Example 2

The procedure of Example 1 was repeated except that 5 parts of the asbestos fibers were used to obtain a similar extruded body.

Example 3

The procedure of Example 1 was repeated except that 5 parts of the stainless steel fibers were used to obtain a similar extruded body.

Example 4

The procedure of Example 1 was repeated except that 15 parts of the stainless steel fibers were used to obtain a similar extruded body.

Example 5

The procedure of Example 1 was repeated except that 5 parts of stainless steel fibers 0.3 (thickness)×0.5 (width) ×12.5 (length) mm were used to obtain a similar extruded body.

Comparative Example 1

The non-metal fibers (asbestos fibers) were not used, and 10 parts of stainless steel fibers 0.3 (thickness) ×0.5 (width) ×25 (length) mm (IS Fiber supplied by Igeta Kohan K.K., Japan) were used as metal fibers. The procedure of Example 1 was carried out to obtain an extruded body having a sectional area of 10×100 mm. The aimed extruded body, however, could not be obtained because lumps of the fibers were formed and clogged in the extruder.

Comp. Example 2

The procedure of Comp. Example 1 was carried out by using as metal fibers stainless steel fibers 0.08 (thickness) ×0.08 (width) ×12.5 (length) mm (NAS Fiber supplied by Nihon Yakin Kogyo K.K., Japan). The aimed extruded body, however, could not be obtained because the metal fibers were entangled together to form lumps of the fiber without uniform mixing in the blend mixing step.

Comp. Example 3

Extrusion was carried out under the same conditions as in Comp. Example 1 except that stainless steel fibers 0.3 (thickness) ×0.5 (width) x 10 (length) mm (IS Fiber) were used a metal fibers.

Comp. Example 4

Extrusion was carried out by the same procedure as in Comp. Example 3 except that stainless steel fibers 0.3 (thickness) ×0.3 (width) ×15 (length) mm (TESUSA supplied by Nihon Kokan K.K., Japan) were used.

From the extruded bodies obtained by the above described Examples and Comparative Examples, 5 pieces each of the extruded article samples 10 (thickness) ×100 (width) ×150 (length) mm were taken at random. The numbers of the metal fibers protruding at the extruded surfaces of the extruded articles (a surface area of 330 sq. cm. exclusive of both cross sections) were counted. The mean numbers of protruding fibers are shown in the following Table 1. As clearly seen from the Comparative Examples, the extruded articles containing metal fibers alone are not feasible for practical uses because the numbers of protruding fibers are more than 20 per about 300 sq. cm of the extruded surface area. According to Examples of the present invention, the numbers of protruding fibers are 6 or less per about 300 sq. cm of extruded surfaces. If the numbers of protrusion are generally 10 or less, preferably 8 or less, more preferably 6 or less, and especially 5 or less, then it can be said that the cured extruded articles of metal fiber-reinforced hydraulic materials are feasible for practical uses.

The conditions of the above described Examples and Comparative Examples as well as the results of the extruded article thus obtained are summarized in Table 1.

TABLE 1

| Examples | Sizes of metal fibers [thickness × width × length mm] | Quantity of metal fibers (parts by weight) | Quantity of non-metal fibers (parts by weight) | Numbers of Protruding metal fibers |
| --- | --- | --- | --- | --- |
| Examples 1 | 0.3 × 0.5 × 10 | 10 | 2.5 | 4 |
| Examples 2 | 0.3 × 0.5 × 10 | 10 | 5 | 2 |
| Examples 3 | 0.3 × 0.5 × 10 | 5 | 2.5 | 0 |
| Examples 4 | 0.3 × 0.5 × 10 | 15 | 2.5 | 5 |
| Examples 5 | 0.3 × 0.5 × 12.5 | 5 | 2.5 | 6 |
| Comp. Examples 1 | 0.3 × 0.5 × 25 | 10 | 0 | failure in extrusion |
| Comp. Examples 2 | 0.08 × 0.08 × 12.5 | 10 | 0 | failure in extrusion |
| Comp. Examples 3 | 0.3 × 0.5 × 10 | 10 | 0 | 19 |
| Comp. Examples 4 | 0.3 × 0.3 × 15 | 10 | 0 | 46 |

As is clear from Table 1, metal fiber-reinforced hydraulic materials can be successfully extruded by the combined use of non-metal fibers and metal fibers expecially having the corresponding diameter of 0.08 mm or more, preferably 0.1 mm or more, and a length of 20 mm or less, preferably 15 mm or less. Moreover, protrusion of metal fibers at extruded surfaces are markedly decreased. Such extruded articles are satisfactorily useful as construction materials, etc. In accordance with the present invention, the non-metal fibers and metal fibers are bound to each other and the following merits are provided: (a) lumps of fibers are not formed in the course of mixing and extruding; (b) bending force applied to fibers when carried by a screw during extrusion is moderated; (c) in the extrusion step and even thereafter, non-metal fibers are orientated to bind the stress acting from the inside of the extruded article to the outside thereof, and thus metal fibers are also orientated substantially in the extruding direction by the binding force of the nonmetal fibers; (d) the strength in the extruding direction is thus increased; and the like. Consequently, protrusion of the metal fibers at the surface of the resulting extruded article can be substantially prevented.

Examples 6 through 14, Comp. Examples 5 through 8

The present extruded article can be provided with a glazed layer by firing. The effect of metal fibers and non-metal fibers on the strength of the glazed extruded article is explained by way of the following Comparative Examples and Examples. Preparation of samples and measurement were conducted as shown below.

The materials and apparatus are the same types as used in Example 1 unless otherwise specified. A mixture of 100 parts of ordinary portland cement used as the inorganic hydraulic material, 110 parts of fragments of porcelain tile used as aggregate, 1.9 parts of methylcellulose, stainless steel fibers having sizes defined in the following Table 2 in quantities shown in Table 2 as metal fibers, and asbestos fibers in quantities shown in Table 2 as non-metal fibers was uniformly blended for several minutes in an omnimixer. The blend was further mixed with 32 parts of water. The resulting blend mixture was extruded from an extruder to obtain an extruded body having a sectional area of 10×100 mm, followed by cutting the extruded body to the length of 150 mm. Each 10 pieces of the extruded articles were selected as samples at random. The samples are allowed to stand in air for 3 days. Then, 5 pieces each of the samples were coated with an ordinary glazing agent uniformly on their one surfaces of 100 by 150 mm, fired at 850° C. for 30 minutes in an electric oven, and slowly cooled. The glazed samples as well as 5 pieces each of the samples which were not glazed and fired were subjected to steam curing under 100% relative humidity at 60° C. for 2 days, and then dried at 100° C. for 3 hours to prepare the test pieces for determining bending strength.

The bending strength was measured by means of a Tensilon tester (supplied by Toyo Baldwin K.K., Japan) at a span of 120 mm and a load velocity of 1 mm/minute. The values in Table 2 show the ratios of bending strength; which are mean bending strength of 5 pieces each of test pieces that were glazed and fired, divided by mean bending strength of 5 pieces each of the corresponding test pieces that were not glazed and fired. As clearly seen from Table 2, the present extruded articles that were glazed, fired and hydrated have bending strength of about 70% or more, normally about 75% or more and preferably about 78% to 100%, in comparison with that of the present extruded articles that were not fired but hydrated sufficiently.

TABLE 2

| Examples | sizes of metal fibers [thickness × width × length mm] | Quantity of stainless steel fibers (parts by weight) | Quantity of asbestos fibers (parts by weight) | Ratio of bending strength |
| --- | --- | --- | --- | --- |
| Examples 6 | 0.3 × 0.5 × 10 | 10 | 2.5 | 0.85 |
| Examples 7 | 0.3 × 0.5 × 10 | 10 | 5 | 0.80 |
| Examples 8 | 0.3 × 0.5 × 10 | 5 | 2.5 | 0.78 |
| Examples 9 | 0.3 × 0.5 × 10 | 15 | 2.5 | 0.91 |
| Examples 10 | 0.3 × 0.5 × 12.5 | 5 | 2.5 | 0.93 |
| Examples 11 | 0.3 × 0.5 × 12.5 | 10 | 2.5 | 0.91 |
| Examples 12 | 0.3 × 0.5 × 12.5 | 15 | 2.5 | 1.00 |
| Examples 13 | 0.3 × 0.3 × 15 | 10 | 2.5 | 0.75 |
| Examples 14 | 0.3 × 0.3 × 15 | 10 | 5 | 0.82 |
| Comp. Examples 5 | — | 0 | 5 | 0.48 |
| Comp. Examples 6 | 0.3 × 0.5 × 10 (too many protrusions) | 10 | 0 | 0.86 |
| Comp. Examples 7 | 0.3 × 0.3 × 15 (too many protrusions) | 10 | 0 | 0.85 |

TABLE 2-continued

| Examples | sizes of metal fibers [thickness × width × length mm] | Quantity of stainless steel fibers (parts by weight) | Quantity of asbestos fibers (parts by weight) | Ratio of bending strength |
|---|---|---|---|---|
| Comp. Examples 8 | 0.3 × 0.5 × 10 | 10 | 7 (excess fibers) | 0.55 |

As clearly seen from Table 2, the glazed extruded article according to the present invention which was fired for a glazed layer is not decreased in the strength ratio as compared with the conventional article containing non-metal fibers alone (Comp. Ex. 5), because of using a small amount (e.g. 5 parts by weight or less) of non-metal fibers such as asbestos fibers and anticorrosive metal fibers such as stainless steel fibers. Also, the present glazed article is not substantially decreased in the strength ratio even by the firing, in comparison with the glazed article containing stainless steel fibers alone (Comp. Ex. 6 and 7) which is not feasible for practical uses because of too many protruding fibers. The present glazed article can maintain its satisfactory strength because of a reinforcing effect of stainless steel fibers having good thermal resistance which are bound by non-metal fibers, even when the non-metal fibers lose reinforcing effects by the firing. In the case of cast or compressed articles reinforced with metal fibers, it has been considered that the metal fibers should be as long as about 1 inch. When the present extruded article containing stainless fibers as metal fibers is fired for glazing according to the present invention, the surfaces of stainless steel fibers are activated by the firing and firmly bonded with an inorganic hydraulic material. Thus, even when the length of metal fibers is 15 mm or less and non-metal fibers are deteriorated to lose reinforcing effects by the firing, satisfactory reinforcing performances are exhibited according to the present invention.

As explained in detail by way of the above described Comparative Examples and Examples, the present extruded article of metal fiber-reinforced inorganic hydraulic materials can be obtained by the combined use as reinforcing fibers of non-metal fibers and metal fibers having the corresponding diameter of 80 microns or more and especially 100 microns or more and a length of 20 mm or less and especially 15 mm or less. Such extruded article reinforced with metal fibers could not be obtained because of formation of fiber lumps, bending of fibers, protrusion of fibers at extruded surfaces, and the like. Moreover, other effects obtained by the present invention are summarized below: (a) The present extruded article has good shape retention and undergoes no sagging even in the case of hollow articles, because the extruded article is bound by a synergistic effect of non-metal fibers and metal fibers. (b) Conventional molded articles reinforced with non-metal fibers alone form cracks and simultaneously fracture when excessive stress is applied thereto. Such tendency is markedly exhibited when the molded article is glazed on its surface by firing, because the non-metal fibers are generally deteriorated or burned out. The present extruded article wherein metal fibers are used in combination is not readily fractured upon formation of cracks but has good durability, because of bonding strength between the inorganic hydraulic material and the metal fibers. (c) Even when the present extruded article containing metal fibers having a length of 15 mm or les is fired for glazing on its surface, good strength can be retained by the combined use of anticorrosive metal fibers such as stainless steel fibers and 5 parts or less of nonmetal fibers. Thus, a cured extruded article having satisfactory strength and a beautiful glazed layer on its surface can be obtained, which also possesses the above described effects.

What is claimed is:

1. A cured extruded article of a metal fiber-reinforced hydraulic material wherein protrusion of metal fibers at the extruded surfaces thereof is substantially prevented and the numbers of protruding metal fibers are not more than 10 per about 300 sq. cm. of the extruded surfaces; said cured article consisting essentially of an extruded mixture consisting essentially of an inorganic hydraulic material, water, a reinforcing amount of metal fibers having a cross-sectional area corresponding to a circle of about 0.08 mm to about 1 mm in diameter and a length of about 4 mm to about 18 mm, and a protrusion-preventing amount of non-metal fibers having a length of from about 1/5 of the metal fibers to about 30 mm the quantity of metal fibers being about 1 part to about 20 parts and that of non-metal fibers being about 1 part to about 15 parts per 100 parts by weight of the inorganic hydraulic material, wherein the quantity of non-metal fibers is about 1/8 or more by weight of metal fibers, and said metal fibers and said non-metal fibers are substantially oriented in the same direction.

2. The cured extruded article according to claim 1, in which the extruded mixture contains at least one additive selected from the group consisting of aggregate, a waterreleasing agent, a plasticizer, an expansive agent, and mixtures thereof.

3. The cured extruded article according to claim 1, in which the length of metal fibers is in the range of about 5 mm to about 15 mm.

4. The cured extruded article according to claim 1, in which the article has a glazed layer on at least a part of the surfaces thereof.

5. The cured extruded article according to claim 2, in which the article has a glazed layer on at least a part of the surfaces thereof.

6. The cured extruded article according to claim 1, in which substantially anticorrosive metal fibers are used.

7. The cured extruded article according to claim 4, in which substantially anticorrosive metal fibers are used.

8. A method of producing a cured extruded article of a metal fiber-reinforced hydraulic material wherein protrusion of metal fibers at the extruded surfaces thereof is substantially prevented; which method comprises extruding a blend mixture consisting essentially of an inorganic material, water, a reinforcing amount of metal fibers having a sectional area corresponding to a circle of about 0.08 mm to about 1 mm in diameter and a length of about 4 mm to about 18 mm, and an amount sufficient to prevent protrusion of metal fibers of non-metal fibers having a length of from about 1/5 of the metal fibers to about 30 mm into an article, said metal fibers and said non-metal fibers being substantially oriented in the same direction, and then curing the resulting extruded article, the quantity of metal fibers being about 1 part to about 20 parts and that of non-metal fibers being about 1 part to about 15 parts per 100 parts by weight of the inorganic hydraulic material, wherein the quantity of non-metal fibers is about 1/8 or more by weight of metal fibers, and the number of protruding metal fibers does not exceed more than about 10 per about 300 sq. cm. of the extruded surfaces.

9. The method according to claim 8, in which the blend mixture contains at least one additive selected from the group consisting of aggregate, a water-releasing agent, a plasticizer, an expansive agent, and mixtures thereof.

10. The method according to claim 8, in which the components other than water of the blend mixture are mixed in a dry state to substantially disperse the metal fibers and non-metal fibers uniformly and then are mixed with water to prepare the blend mixture.

11. The method according to claim 9, in which the components other than water of the blend mixture are mixed in a dry state to substantially disperse the metal fibers and non-metal fibers uniformly and then are mixed with water to prepare the blend mixture.

12. The method according to claim 8, in which the extruded article is coated with a glazing agent on its desired surface, heated to a temperature of a melting temperature of the glazing agent to about 1000° C., and then hydrated.

13. The method according to claim 9, in which the extruded article is coated with a glazing agent on its desired surface, heated to a temperature of a melting temperature of the glazing agent to about 1000° C., and then hydrated.

14. The method according to claim 10, in which the extruded article is coated with a glazing agent on its desired surface, heated to a temperature of a melting temperature of the glazing agent to about 1000° C., and then hydrated.

15. The method according to claim 12, in which substantially anticorrosive metal fibers are used.

16. The method according to claim 8 wherein the hydraulic material comprises inorganic cement.

17. The method according to claim 8 wherein the water contained in the blend mixture is about 20 to about 40 parts per 100 parts by weight of the inorganic hydraulic material.

18. The cured article according to claim 1 wherein the hydraulic material comprises inorganic cement.

19. The process of claim 8 wherein the metal fibers have a length ranging from about 5 mm to about 15 mm.

20. A cured extruded article of a metal fiber-reinforced hydraulic material produced according to the method of claim 8.

* * * * *